United States Patent
Bramley et al.

(10) Patent No.: US 12,318,959 B2
(45) Date of Patent: *Jun. 3, 2025

(54) TILTABLE CARRIAGE ASSEMBLY AND SAWMILL INCORPORATING SAME

(71) Applicant: Woodland Mills Inc., Port Perry (CA)

(72) Inventors: Neil K. Bramley, Port Perry (CA); Joshua J. Malcolm, Port Perry (CA)

(73) Assignee: Woodland Mills Inc., Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/484,046

(22) Filed: Sep. 24, 2021

(65) Prior Publication Data

US 2022/0134591 A1 May 5, 2022

Related U.S. Application Data

(63) Continuation of application No. 16/965,773, filed as application No. PCT/CA2020/000037 on Mar. 11, 2020, now Pat. No. 11,130,253.

(30) Foreign Application Priority Data

Mar. 21, 2019 (CA) ...................... 3037514

(51) Int. Cl.
  *B27B 15/02* (2006.01)
  *B27B 7/00* (2006.01)
  (Continued)

(52) U.S. Cl.
  CPC ............... *B27B 15/02* (2013.01); *B27B 7/00* (2013.01); *B27B 13/04* (2013.01); *B27B 17/005* (2013.01);
  (Continued)

(58) Field of Classification Search
  CPC ........... B27B 15/02; B27B 13/04; B27B 7/00; Y10T 83/101–7126; Y10T 83/7201;
  (Continued)

(56) References Cited

U.S. PATENT DOCUMENTS 2,592,001 A * 4/1952 Bereit ...................... B28D 7/04
  91/169
2,691,206 A * 10/1954 Kautz .................. B23D 53/026
  144/144.1

(Continued)

FOREIGN PATENT DOCUMENTS

CA 2746825 A1 1/2013
CN 204772844 11/2015
(Continued)

OTHER PUBLICATIONS

European Search Report for Application No. 20771977.4-1005 / 3817903; PCT/CA2020000037; dated Feb. 7, 2021, 7 pages.

(Continued)

*Primary Examiner* — Laura M Lee
(74) *Attorney, Agent, or Firm* — Boyle Fredrickson, S.C.

(57) ABSTRACT

A sawmill assembly comprising a bed, a carriage and a tilting device. The bed has a pair of substantially parallel rails that define a first plane, a first axis perpendicular to the first plane, and a second plane perpendicular to both the first plane and a longitudinal axis of the rails. The carriage is movably supported along the rails. The tilting device allows a user to adjust a tilt angle of the carriage in the second plane, relative to the first axis. Also disclosed are methods of adjusting a blade angle of the sawmill assembly, and methods of cutting a tapered piece from a workpiece material.

20 Claims, 14 Drawing Sheets

(51) Int. Cl.
*B27B 13/04* (2006.01)
*B27B 17/00* (2006.01)

(52) U.S. Cl.
CPC ........ *Y10T 83/7108* (2015.04); *Y10T 83/7208* (2015.04); *Y10T 83/722* (2015.04)

(58) Field of Classification Search
CPC ............ Y10T 83/7208; Y10T 83/7214; B23D 55/088; B23D 53/04–045; B28D 1/08
USPC .................................................... 83/794–798
See application file for complete search history.

(56) References Cited

U.S. PATENT DOCUMENTS

| | | | |
|---|---|---|---|
| 3,739,679 A | 6/1973 | Schwend | |
| 3,789,717 A | 2/1974 | Stolzer | |
| 3,941,022 A | 3/1976 | Sato et al. | |
| 4,111,085 A * | 9/1978 | Johnson | B26D 3/10 83/811 |
| 4,275,632 A | 6/1981 | Ross | |
| 4,478,120 A | 10/1984 | Sugimoto | |
| 4,519,283 A * | 5/1985 | Sanborn | B27B 29/10 83/156 |
| 4,559,858 A | 12/1985 | Laskowski et al. | |
| 4,792,190 A * | 12/1988 | Bertrand | B23D 45/024 404/90 |
| 4,805,500 A | 2/1989 | Salto et al. | |
| 5,035,166 A | 7/1991 | Carlson et al. | |
| 5,081,890 A | 1/1992 | Stolzer | |
| 5,213,022 A * | 5/1993 | Elgan | B23D 53/04 83/803 |
| 5,273,090 A * | 12/1993 | Klemma | B27C 5/06 144/136.9 |
| 5,347,903 A * | 9/1994 | Stolzer | B23D 53/04 83/812 |
| 5,819,626 A * | 10/1998 | Lucas | B23D 45/024 83/485 |
| 6,038,954 A | 3/2000 | Keener | |
| 6,722,248 B1 * | 4/2004 | Johnston, Sr. | B27B 15/02 83/813 |
| 6,772,665 B1 | 8/2004 | Hurdle, Jr. | |
| 6,966,246 B2 | 11/2005 | Yeh | |
| 7,000,658 B1 * | 2/2006 | Soukiassian | B27C 9/02 144/286.5 |
| 7,530,298 B2 * | 5/2009 | Peterson | B27B 5/207 144/378 |
| 7,784,387 B2 | 8/2010 | Dale et al. | |
| 8,261,647 B2 | 9/2012 | Dale | |
| 8,276,493 B2 | 10/2012 | Dale | |
| 8,573,106 B2 | 11/2013 | Burton | |
| 9,352,480 B2 | 5/2016 | Belzile | |
| 9,687,923 B2 | 6/2017 | Chiao | |
| 11,548,182 B1 * | 1/2023 | Schie | B27B 13/08 |
| 2003/0024371 A1 | 2/2003 | Gibsor | |
| 2004/0244557 A1 * | 12/2004 | Peterson | B27B 7/00 83/663 |
| 2011/0132165 A1 | 6/2011 | Dale | |
| 2011/0138965 A1 | 6/2011 | Dale | |
| 2011/0138985 A1 | 6/2011 | Dale | |
| 2012/0037276 A1 * | 2/2012 | Granberg | B27B 1/00 83/820 |
| 2013/0283991 A1 | 10/2013 | Belzile | |
| 2013/0312582 A1 | 11/2013 | Chiao | |
| 2016/0175952 A1 * | 6/2016 | Chiao | B23D 53/04 83/812 |
| 2016/0236289 A1 | 8/2016 | Voortman et al. | |
| 2019/0084177 A1 * | 3/2019 | Lucas | B27B 9/04 |
| 2021/0008751 A1 * | 1/2021 | Bramley | B27B 7/00 |
| 2021/0023733 A1 * | 1/2021 | Peterson | B27B 7/00 |
| 2024/0375310 A1 * | 11/2024 | Cabrit | B27B 15/02 |

FOREIGN PATENT DOCUMENTS

| | | | | |
|---|---|---|---|---|
| DE | 1703174 A1 | 1/1972 | | |
| JP | 09309107 A * | 12/1997 | | B28D 1/08 |
| JP | 27-21109 | 3/1998 | | |
| JP | 4711236 B2 * | 6/2011 | | B23D 53/04 |
| KR | 100970782 B1 * | 7/2010 | | B23D 59/001 |
| WO | WO-03037580 A1 * | 5/2003 | | B23D 45/024 |

OTHER PUBLICATIONS

International Search Report for Application No. PCT/CA2020/000037; dated Jul. 2, 2020, 4 pages.
IP Australian Government: Examination Report No. 2; Application No. 2020242085; dated Mar. 13, 2025; 3 pages.

* cited by examiner

TILTABLE CARRIAGE ASSEMBLY AND SAWMILL INCORPORATING SAME

CROSS-REFERENCE TO RELATED APPLICATION

This application is a continuation of U.S. patent application Ser. No. 16/965,773 filed Jul. 29, 2020, (now U.S. Pat. No. 11,130,253) which claims priority to PCT/CA2020/000037, filed on Mar. 11, 2020, and to Canadian Patent Application No. 3,037,514, filed on Mar. 21, 2019, the contents of each of which are hereby incorporated by reference.

FIELD OF THE INVENTION

The present invention relates generally to the field of sawmills. More particularly, the present invention relates to portable sawmills having a band saw cutting blade.

BACKGROUND OF THE INVENTION

A sawmill typically includes three main components, namely, a bed, a carriage, and a saw head. The bed is adapted to support a log extending horizontally along the bed. The carriage is mounted to the bed for horizontal movement along the length of the log, and the saw head is mounted to vertical posts on the carriage. The vertical posts of the carriage permit vertical movement of the saw head relative to the carriage, and the carriage is adapted for horizontal movement along the bed. The saw head typically includes a band saw blade to cut the log as the carriage is moved horizontally along the bed. U.S. Pat. No. 4,275,632 to Ross, and U.S. Pat. No. 7,784,387 to Dale disclose examples of such a sawmill.

A problem with the sawmills disclosed in the U.S. '632, and '387 patents, and others like them, is that the angle of the blade is fixed in a horizontal orientation, allowing an operator to only make flat cuts along the log to form flat boards, i.e. boards having parallel top and bottom surfaces.

One attempt for overcoming this problem was to provide a jig that is mountable to the bed and allows the operator to tilt the log on the bed. However, the requirement for the additional jig adds to the cost and complexity of the sawmill and adds another component that needs to be stored when not in use. Another disadvantage of the jig is that the user must install and remove it frequently, because the jig can not be on the sawmill bed when milling a round log to a square cant. Once the log is made into a square cant, the cant is removed, the jig installed and then the cant is secured into the jig. This requires multiple steps and is very inefficient. By way of example, one such jig manufactured by Wood-Mizer LLC, Indianapolis, Indiana, U.S.A and referred to as a Shingle & Lapsider option or SLR.

Other attempts include sawmills with stationary saw heads, that may be pivoted by the operator to position the blade between a horizontal orientation and an angled orientation, and adapting the bed to allow the operator to feed the log into the saw head. U.S. Pat. No. 4,805,500 to Saito, U.S. Pat. No. 6,772,665 to Hurdle, U.S. Pat. No. 6,966,246 to Yeh, disclose examples of such sawmills.

Other prior art sawmills include: U.S. Pat. No. 3,739,679 (Schwend); U.S. Pat. No. 3,789,717 (Stolzer); U.S. Pat. No. 3,941,022 (Sato); U.S. Pat. No. 4,478,120 (Sugimoto); U.S. Pat. No. 4,559,858 (Laskowski); U.S. Pat. No. 5,035,166 (Carlson); U.S. Pat. No. 5,081,890 (Stolzer); U.S. Pat. No. 5,213,022 (Elgan); U.S. Pat. No. 6,038,954 (Keener); U.S. Pat. No. 6,772,665 (Hurdle); U.S. Pat. No. 6,966,246 (Yeh); U.S. Pat. No. 8,261,647 (Dale); U.S. Pat. No. 8,276,493 (Dale); U.S. Pat. No. 8,573,106 (Burton); U.S. Pat. No. 9,687,923 (Chiao); and U.S. Pat. App. Nos. 2003/0024371 (Gibson); and 2013/0283991 (Belzile).

However, there is a continuing need for improvements in sawmills.

SUMMARY OF THE INVENTION

What is desired therefore, is a sawmill which overcomes at least some of the problems associated with the prior art.

According to a preferred embodiment of the present invention, there is disclosed a sawmill assembly comprising a bed, a carriage and a tilting device. The bed is sized and shaped to support a workpiece material such as a log or other piece of wood. The bed has a pair of substantially parallel rails that define a first plane, a first axis perpendicular to the first plane, and a second plane perpendicular to both the first plane and a longitudinal axis of the rails. The carriage is movably supported along the rails and carries a saw head. According to the preferred embodiment of the invention the saw head comprises a band saw having a cutting blade adapted for cutting wood. The tilting device allows a user to adjust a tilt angle of the carriage in the second plane, relative to the first axis, to set the cutting blade in a range of angles between 0 and 10 degrees, inclusive, relative to the first plane. For ease of understanding, the first plane may be considered to be a horizontal plane, which is substantially parallel to the ground or surface on which the bed of the sawmill is situated. In this way, a cutting angle of the cutting blade may be set by a user within a range of angles between substantially horizontal, and a maximum tilt angle relative to horizontal (i.e. 10 degrees above horizontal). Once the cutting angle of the cutting blade is set by adjusting the tilt angle of the carriage, the user can operate the sawmill to make an angled cut along the length of the workpiece material length being supported on the bed of the sawmill. The ability to set the cutting angle of the cutting blade in this manner enables the user to cut tapered pieces from the workpiece material, such as, for example, lap siding boards, roof shingles, roof shakes, and wood shims, i.e. pieces having non-parallel top and bottom surfaces.

Also disclosed are methods of adjusting a blade angle of the sawmill assembly, and methods of cutting a tapered piece from a workpiece material.

Therefore, according to one aspect of the present invention, there is disclosed a sawmill assembly comprising:
  a bed, said bed comprising:
    a pair of substantially parallel rails, said rails defining a first plane, a first axis perpendicular to said first plane, and a second plane perpendicular to both said first plane and a longitudinal axis of said rails;
  a carriage movably supported along said rails, said carriage comprising:
    a tilting device for adjusting a tilt angle of said carriage in said second plane, relative to said first axis.

According to another aspect of the present invention, there is disclosed a method of adjusting a blade angle of the above sawmill assembly, said method comprising the step of:
  manipulating said tilting device to adjust said tilt angle of said carriage in said second plane.

According to another aspect of the present invention, there is disclosed a method of cutting a tapered piece from a workpiece material, said method comprising the steps of:
  providing a sawmill comprising:

a bed, said bed comprising:
  a pair of substantially parallel rails, said rails defining a first plane, a first axis perpendicular to said first plane, and a second plane perpendicular to both said first plane and a longitudinal axis of said rails;
  a carriage movably supported along said rails; and
  a saw head attached to said carriage, said saw head comprising a band saw having a blade oriented perpendicular to a vertical axis of said carriage and parallel to said second plane; supporting said workpiece material on said bed;
  tilting said carriage in said second plane, at an angle to said first axis; and
  moving said tilted carriage along said rails in one direction as said blade cuts through said workpiece material thereby cutting said tapered piece from said workpiece material.

According to another aspect of the present invention, there is disclosed a method of cutting a tapered piece from a workpiece material, said method comprising the steps of:
  supporting said workpiece material on a bed of a sawmill between a pair of substantially parallel rails of said bed, said rails defining a first plane, a first axis perpendicular to said first plane, and a second plane perpendicular to both said first plane and a longitudinal axis of said rails;
  tilting a carriage of said sawmill in said second plane, at an angle to said first axis, said carriage comprising a band saw having a blade oriented perpendicular to a vertical axis of said carriage and parallel to said second plane; and
  moving said tilted carriage along said rails in one direction as said blade saws through said workpiece material thereby cutting said tapered piece from said workpiece material.

BRIEF DESCRIPTION OF THE DRAWINGS

Reference will now be made to the preferred embodiments of the present invention with reference, by way of example only, to the following drawings in which.

DETAILED DESCRIPTION OF THE PREFERRED EMBODIMENTS

The present invention is described in more detail with reference to exemplary embodiments thereof as shown in the appended drawing. While the present invention is described below including preferred embodiments, it should be understood that the present invention is not limited thereto. Those of ordinary skill in the art having access to the teachings herein will recognize additional implementations, modifications, and embodiments which are within the scope of the present invention as disclosed and claimed herein.

Figure 1:
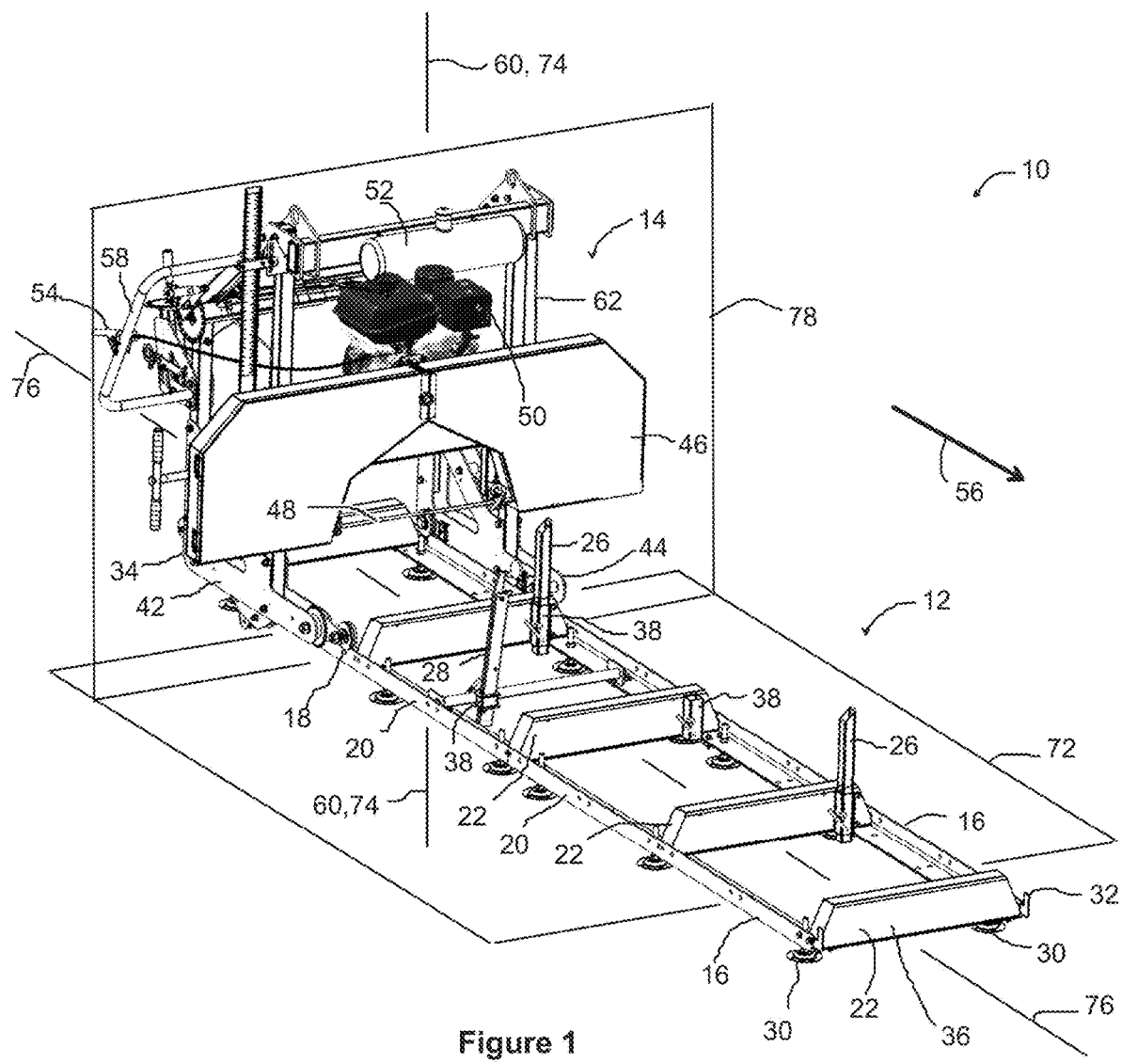
FIG. 1 is a perspective view of a sawmill assembly showing a carriage movably supported along rails of a bed, according to an embodiment of the present invention.

A sawmill apparatus 10 according to an embodiment of the present invention is shown in FIG. 1. The sawmill 10 includes a bed 12 and a carriage 14. The bed 12 has a pair of substantially parallel rails 16, and the carriage 14 is movably supported along the rails 16, on wheels 18 as shown. Preferably, the rails 16 may be formed from a plurality of rail sections 20. Several log bunks 22 are positioned between the rails 16 and arranged to support a workpiece material 24 thereon. Log bunks 22 are preferably structural components of the bed 12 that support the workpiece material 24 during the milling operation. The workpiece material 24 rests on the log bunks 22 and in turn they carry the entire weight of the workpiece material 24. Preferably, the log bunks 22 may also add to the overall structural strength of the bed 12 as they tie into the rails 16 to help keep them true and square. It has been found that providing a level square bed 12 is desirable for achieving wood boards of consistent thickness since the carriage 14 follows along the rails 16.

Figure 2:
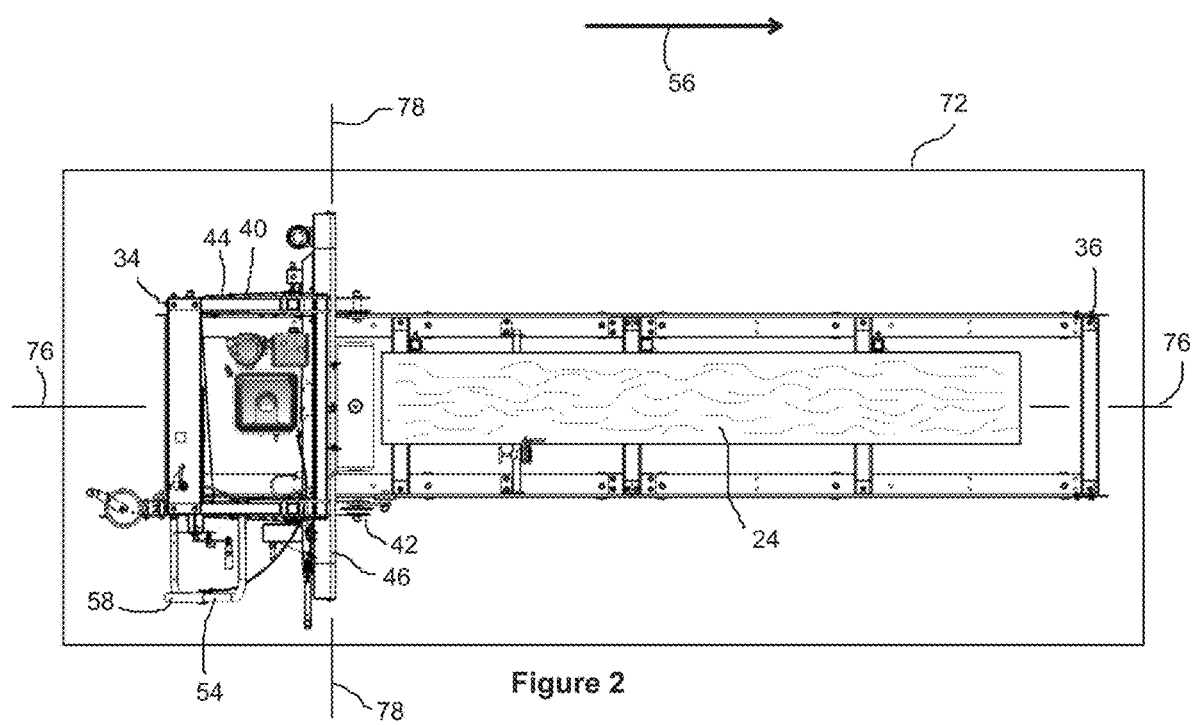
FIG. 2 is a top view of the sawmill assembly of FIG. 1, with a workpiece material supported on the bed.

By way of example, the workpiece material 24 may be made from wood, such as a log, as best seen in FIG. 2. Preferably, one or more log supports 26 and clamps 28 are also provided on the bed 12 and configured to secure the workpiece material 24 to the bed 12 between the rails 16. As will be appreciated, the log supports 26 and clamps 28 may be used to help prevent movement of the workpiece material 24 during operation of the sawmill 10. Additionally, a plurality of adjustable feet 30 may be provided under the bed 12 and configured to permit a sawmill operator to level the bed 12 during installation and setup and provide uniform support for the rails 16 when the bed 12 is installed on uneven ground. Preferably, the bed 12 will also be provided with wheel stops 32 at both ends of the rails 16 to ensure that the carriage 14 does not inadvertently roll off of the rails 16 at one end 34 or the other 36. Preferably also, the log supports 26 and clamps 28 may be removably, and slidably retained in holders 38, to allow their heights above the rails 16 to be adjusted. In this way, the heights of the log supports 26 and clamps 28 may be individually adjusted by the operator, or they may be individually removed from the bed 12, as needed so as not to interfere with the movement of the carriage 14 along the rails 16 between the one end 34 of the bed 12 and the other end 36 of the bed 12. Preferably, the bed 12 may be configured as a kit of parts, to be assembled by the operator without the need for specialized tools.

With continued reference to FIG. 1, the carriage 14 has a frame 40 with two sides 42, 44 that straddle the bed 12, and is moveably supported along the rails 16 on wheels 18, between the one end 34 and the other end 36. The wheels 18 preferably include annular grooves to limit lateral movement on the rails 16. Preferably, the frame 40 is configured to carry a saw head 46 attached or mounted thereto. Preferably, the saw head 46 includes a band saw, having a blade 48 adapted to cut the workpiece material 24, a motor 50 (i.e. electric or internal combustion motor) to drive the band saw, and other components that may be necessary or desirable to operate and control the band saw, such as, for example, a fuel tank 52, and a throttle 54.

As shown in FIG. 2, the saw head 46 is preferably configured to cut the workpiece material 24 supported on the bed 12, as the carriage 14 is moved along the rails 16 in at least one direction 56, for example, the from the one end 34 of the bed 12 to the other end 36 of the bed 12, as shown. Of course, it will be appreciated that the saw head 46 may also be configured to cut the workpiece material 24 in a direction opposite to the at least one direction 56. More preferably, the saw head 45 may be configured to cut the workpiece material 24 in both directions, for example, by providing the blade 48 with cutting surfaces facing both the one end 34 and the other end 36. All such embodiments are comprehended by the present invention.

Preferably, the carriage 14 may be configured to be moved along the rails 16 by the operator between the one end 34 and the other end 36, while the band saw is on and driving the blade 48. For example, the operator may apply force to the carriage 14 to cause it to move in the one direction 56 or the opposite direction. A handle 58 may preferably be provided on the frame 40 to facilitate the pushing or pulling the carriage 14 by the operator.

Figure 5:
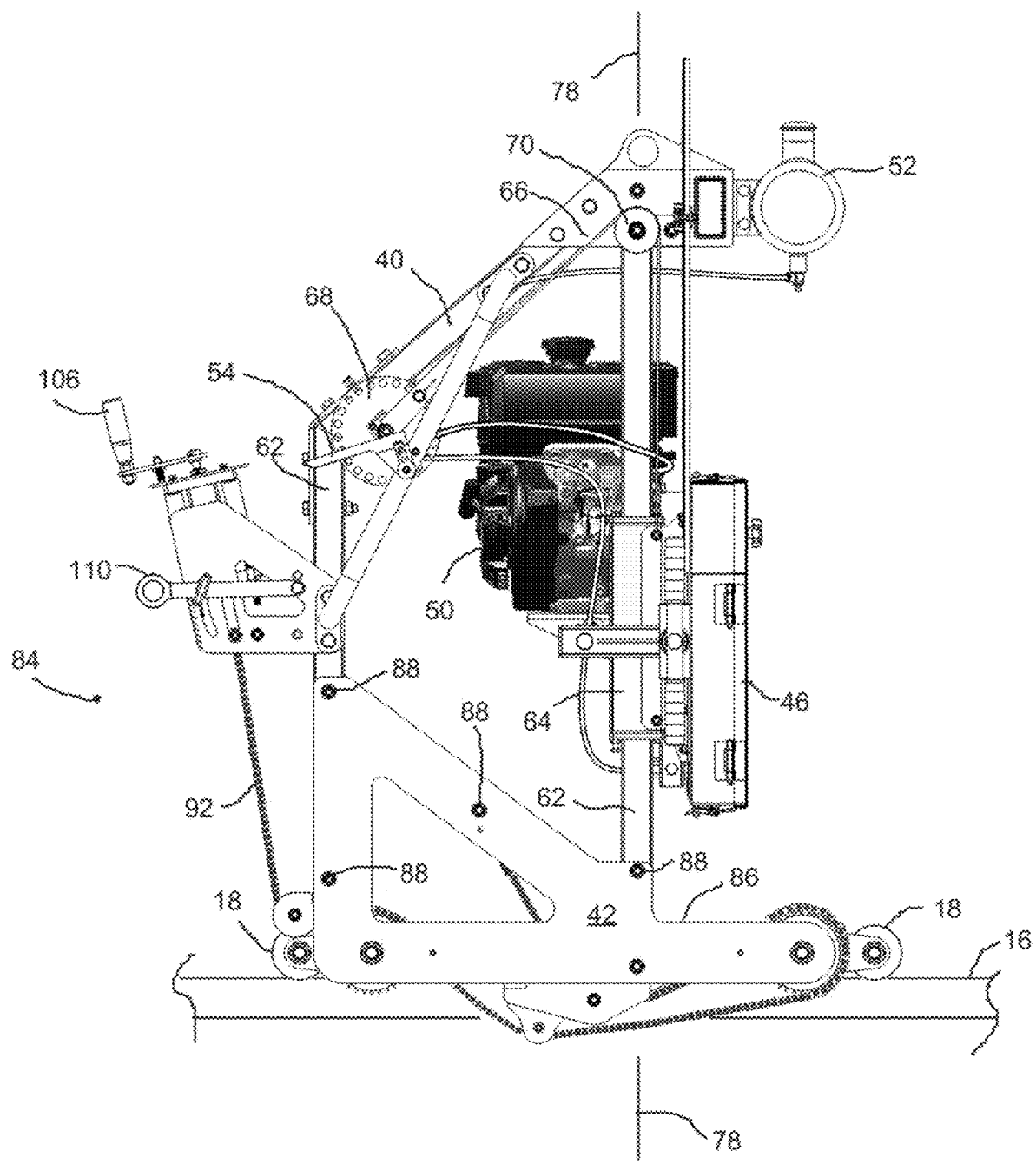
FIG. 5 is a side view of the carriage of FIG. 1, showing a tilting device comprising a pair of wheel assemblies on one side of the carriage in a retracted position.

According to a preferred embodiment of the present invention, the saw head 46 is attached to the frame 40 together with means to raise or lower the saw head 46 in the carriage 14 along a vertical axis 60 of the carriage 14, with the blade 48 remaining substantially perpendicular to the vertical axis of 60 of the carriage 14. Preferably, the raising and lowering of the saw head 46 may be achieved by slidably mounting the saw head 46 to a pair of vertically oriented posts 62 at the sides 42,44 of the frame 40, and operatively connecting the sliding saw head 46 to a winch and pulley assembly. By way of example, as best seen in FIG. 5, a preferred means to raise or lower the saw head 46 may include at least one guide sleeve 64 adapted to slidingly accommodate a vertically oriented post 62 on one side 42 of the frame 40. More preferably, the saw head 46 includes two guide sleeves 64 adapted to slidingly accommodate vertically oriented posts 62 on both sides 42 and 44 of the frame 40. A cable 66 connects a winch 68 and a pulley 70 mounted to the frame 40, to the sliding saw head 46 to allow the operator to raise and lower the saw head 46 by manipulating the winch 68. It will be appreciated that raising or lowering the saw head 46 translates into raising or lowering of the blade 48 of the saw head 46 above the bed 12, enabling the operator to adjust the height of the blade 48 above the bed 12. Accordingly, the operator may manipulate the means to raise or lower the saw head 46 to cut the workpiece material 24 supported on the bed 12 at a desire height relative to the bed 12. In this way, the operator may cut a piece from the workpiece material 24, such as for example, a flat board, having a desired thickness. However, the person skilled in the art will recognize other known ways of raising and lowering the saw head 46. All such other known ways of raising or lowering the saw head 46 are comprehended by the present invention.

Preferably, the carriage 14 may also be configured as a kit of parts, to be assembled by the operator without the need for specialized tools.

Figure 3:
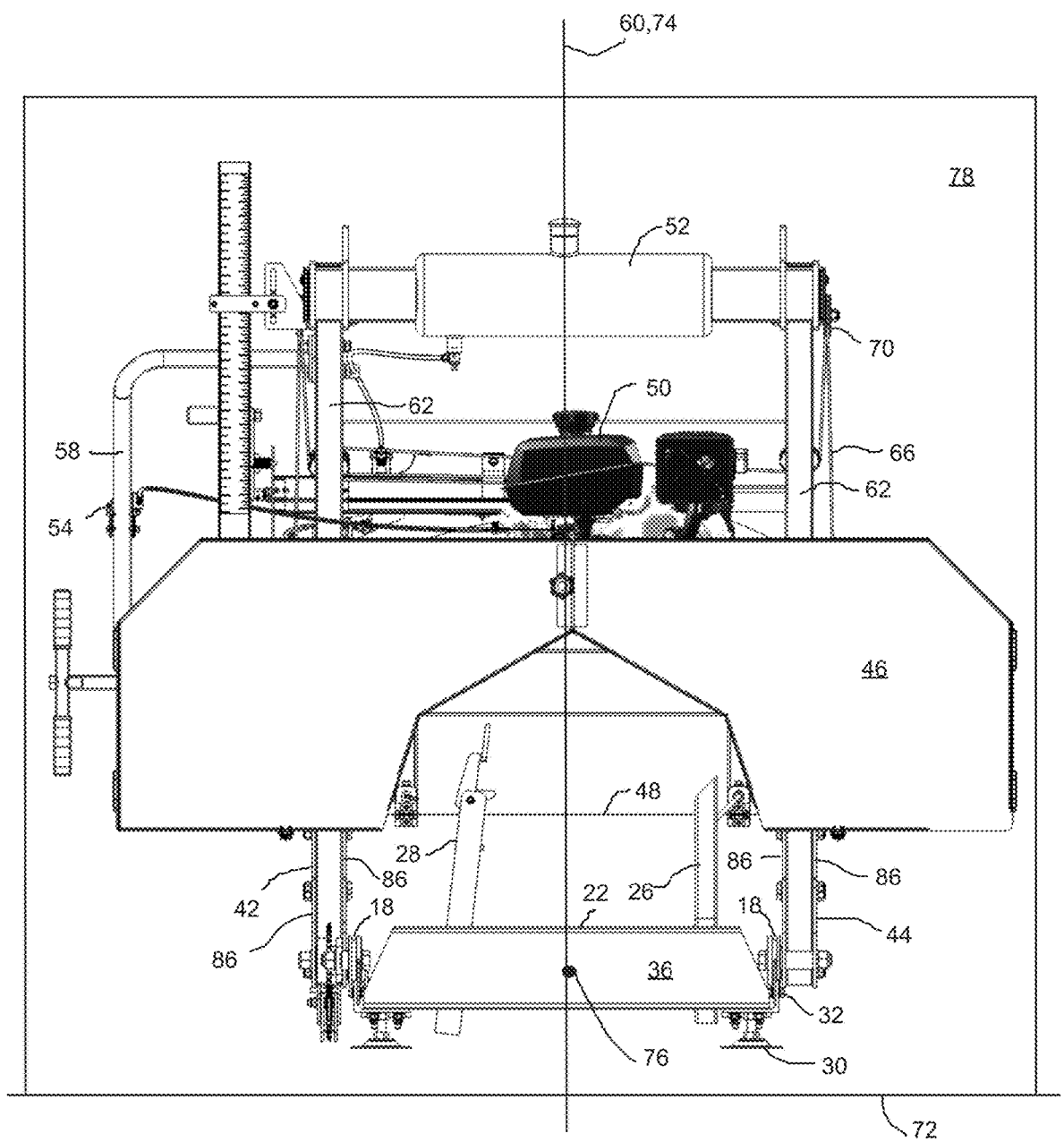
FIG. 3 is a front view of the sawmill assembly of FIG. 1.

With reference to FIGS. 1 to 3, the rails 16 define a first plane 72, a first axis 74 perpendicular to the first plane 72, a longitudinal axis 76 of the rails 16, and a second plane 78 that is perpendicular to both the first plane 72 and the longitudinal axis 76. For ease of understanding, the first plane 72 may be considered to be a horizontal plane, which is substantially parallel to the ground or surface on which the bed 12 of the sawmill 10 is situated.

Figure 4:
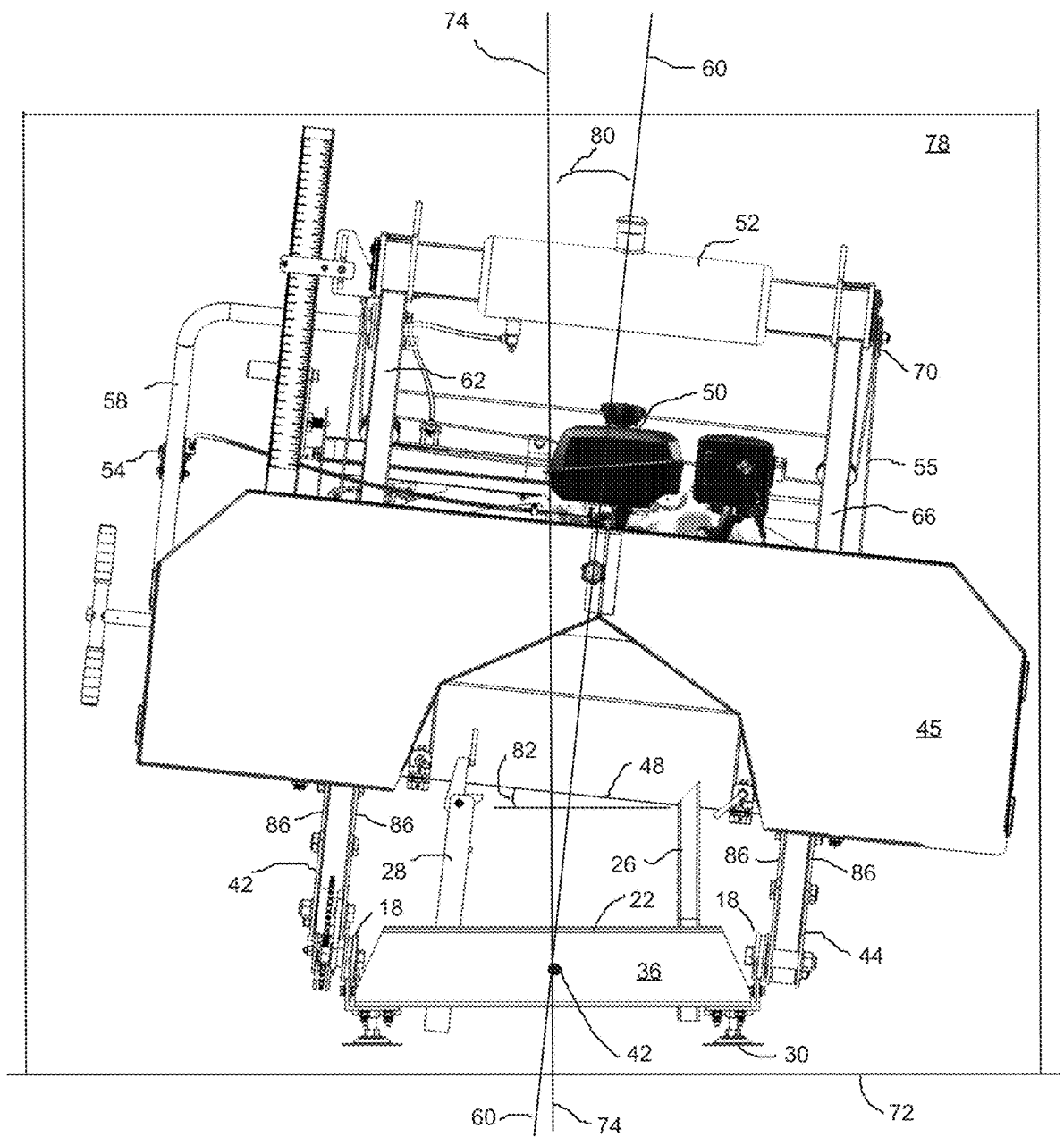
FIG. 4 is a front view of the sawmill assembly of FIG. 3, showing the carriage in a tilted position relative to the bed, after a tilt angle of the carriage has been adjusted.

In FIGS. 3 and 4, the blade 48 is oriented perpendicular to the vertical axis 60 of the carriage 14, and parallel to the second plane 78. With reference to FIG. 3, the sawmill 10 has the carriage 14 oriented relative to the bed 12 such that the blade 48 of the saw head 46 is positioned above the bed 12, substantially parallel to the first, horizontal plane 72, analogous to a conventional sawmill. The vertical axis 60 of the carriage 14 is aligned with the first axis 74. With the sawmill 10 in the configuration shown in FIG. 3, the blade 48 is substantially parallel to the first, horizontal plane 72, as well as being substantially perpendicular to the longitudinal axis 76 of the bed 12. What is important is that the tilt angle 80 of the carriage 14 is about 0 degrees relative to the first axis 74, which results in the blade 48 being positioned at an angle 82 of 0 degrees relative to the first, horizontal plane 72.

Accordingly, it will be appreciated that operation of the sawmill 10 in the configuration shown in FIG. 3 permits the operator to make substantially horizontal cuts through the workpiece material 24 by pushing or pulling the carriage 14 from the one end 34 to the other end 36 of the bed. Furthermore, it will be appreciated that by using the sawmill 10 in the configuration shown in FIG. 3 to make a pair of sequential, horizontal cuts in the workpiece material 24, and manipulating the winch 68 to lower the saw head 46 between the pair of cuts, the operator may cut a piece from the workpiece material 24, such as for example, a flat board, having a desired thickness.

Although, the saw head 46 according to a preferred embodiment of the present invention includes a band saw having a blade 48 oriented substantially parallel to the first, horizontal plane 72, it is contemplated that the band saw may be replaced with another known type of saw such that the blade 48 is held in the carriage 14 substantially parallel to the horizontal plane 72. By way of example only, such other known type of saw may include a chain saw, a reciprocating saw, or a circular saw. All such embodiments are comprehended by the present invention.

With reference to FIG. 4, the carriage 14 is tilted as compared to the carriage 14 shown in FIG. 3. In particular, the sawmill 10 shown in FIG. 4 has the carriage 14 oriented relative to the bed 12 such that the blade 48 of the saw head 46 is positioned above the bed 12, but at an angle to the first, horizontal plane 72. The vertical axis 60 of the carriage 14 is no longer aligned with the first axis 74 defined by the rails 16, but is instead at an angle 80 away from the first axis 74, in the second plane 78. With the sawmill 10 in the configuration shown in FIG. 4, the blade 48 is positioned at an angle 82 to the first, horizontal plane 72, while remaining substantially perpendicular to the longitudinal axis 76 of the bed 12. What is important is that the tilt angle 80 of the carriage 14 is greater than 0 degrees relative to the first axis 74, which results in the blade 48 being positioned at an angle 82 that is greater than 0 degrees relative to the first, horizontal plane 72. Preferably, the carriage 14 may be configured to permit the operator to adjust the tilt angle 80 of the carriage to provide a maximum tilt angle 80 of about 6 to 10 degrees, inclusive, relative to the first axis 74, which corresponds to a maximum blade angle 82 of about 6 to 10 degrees, inclusive, relative to the first, horizontal plane 72. However, it is contemplated that the maximum tilt angle 80 of the carriage 14 may be greater than 10 degrees, provided that additional safeguards are implemented into the sawmill 10 prevent the carriage 14 from tipping over completely. All such embodiments are comprehended by the present invention.

Accordingly, it will be appreciated that operation of the sawmill 10 in the configuration shown in FIG. 4 permits the operator to make angled cuts through the workpiece material 24 by pushing or pulling the carriage 14 from the one end 34 to the other end 36 of the bed 12. Furthermore, it will be appreciated that by using the sawmill 10 in the configuration shown in FIG. 4 to make a pair of successive horizontal and angled cuts in the workpiece material 24, and manipulating the winch 68 to lower the saw head 46 between the pair of successive horizontal and angled cuts, the operator may cut a tapered piece from the workpiece material 24, such as for example, a lap siding board, a roof shingle, a roof shake, or a wood shim, i.e. pieces having non-parallel top and bottom surfaces. Other tapered pieces may be cut from the workpiece material 24 by making pairs of successive angled cuts, wherein the blade angle 82 is different between successive cuts.

With reference now to FIGS. 5 to 8, a tilting device 84 will be described according to an embodiment of the present invention. The tilting device 84 preferably allows the operator to adjust the tilt angle 80 of the carriage 14 relative to the first axis 74 in the second plane 78, and thus the blade angle 82, between the configuration shown in FIG. 3 and the configuration shown in FIG. 4. Preferably, the tilting device 84 may be configured to adjust the tilt angle 80 in a range sufficient to allow the operator to use the sawmill 10 to cut lap siding boards, roof shingles, roof shakes, wood shims, and the like, from the workpiece material 24. For example, although the angles provided on lap siding and shingles is variable, they are typically in the range of 3 to 10 degrees, inclusive. Accordingly, the preferred tilting device 84 may be configured to adjust the tilt angle 80 of the carriage 14 relative to the first axis in a range between 0 and 10 degrees, inclusive, which translates into a blade angle 82 ranging between 0 and 10 degrees, inclusive, relative to the first, horizontal plane 72. However, good results have been obtained by configuring the tilting device 84 to provide a maximum tilt angle between 6 and 10 degrees, inclusive. What is important is that the tilting device 84 is configured to enable the operator to adjust the tilt of the carriage 14, to provide a tilt angle 80 greater than 0 degrees relative to the first axis 74, which results in the blade 48 being positioned at an angle 82 that is greater than 0 degrees relative to the first, horizontal plane 72, yet sufficient for making the angled cuts required by a particular application. Although, it is contemplated that the maximum tilt angle 80 of the carriage 14 may be greater than 10 degrees, additional safeguards may need to be implemented into the sawmill 10 to prevent the carriage 14 from tipping over completely. All such embodiments are comprehended by the present invention.

Figure 6:
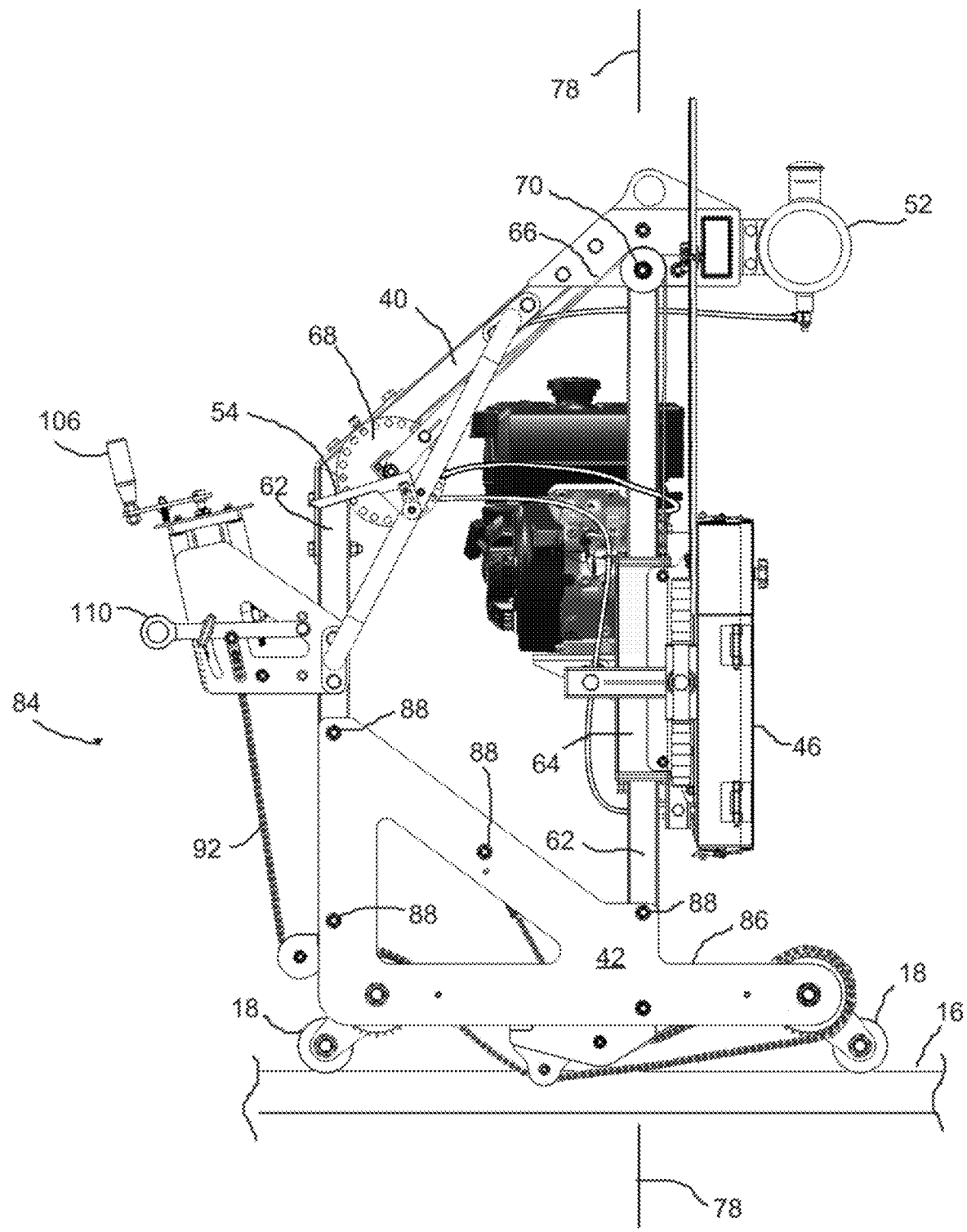
FIG. 6 is a side view of the carriage of FIG. 5, showing the pair of wheel assemblies on the one side of the carriage in an extended position.

FIGS. 5 and 6 show the one side 42 of the carriage 14 supported on a section of rails 16. The frame 40 of the carriage 14 has vertically oriented posts 62 secured to, and sandwiched between pairs of frame plates 86, with fasteners 88, on both sides 42, 44 of the carriage 14. The tilting device 84 shown in FIGS. 5 and 6 includes two wheels 18 on one side 42 of the carriage 14, a pair of sprocket assemblies 90 carrying the wheels 18, a chain 92, chain guides 94, and a chain tensioner 96. Although not visible in FIGS. 5 and 6, a pair of wheels 18 is also included on the other side 44 of the carriage 14, as best seen in FIG. 1. The wheels 18 on the other side 44 are fixedly attached to the inner frame plate 86, facing towards the longitudinal axis 76 of the bed 12, and configured to roll on rail 16. By providing the wheels 18 facing inwardly on the carriage in this way, the carriage 14 may be provided with a wider cutting opening, with a bed 12 that has a narrower foot print. However, it is contemplated that the wheels 18 may be attached in the space formed between the pair of frame plates 96, or the wheels 18 may be attached to the outer frame plate 86 to face away from the longitudinal axis 76 of the bed 12. All such embodiments are comprehended by the present invention.

FIG. 5 shows the tilting device 84 set to position the wheels 18 on the one side 42 in a retracted position. With the wheels 18 in the retracted position, the one side 42 is substantially the same height as the other side 44. Thus, setting the tilting device 84 to position the wheels 18 on the one side 42 in the retracted position, places the sawmill 10 in the configuration shown in FIG. 3, namely, the vertical axis 60 of the carriage 14 being aligned with the first axis 74 of the bed (i.e. the tilt angle 80 is 0 degrees), such that the blade 48 is parallel to the horizontal, first plane 72 (i.e. the blade angle 82 is 0 degrees). In other words, the carriage 14 is substantially level.

FIG. 6, on the other hand, shows the tilting device 84 set to position the wheels 18 on the one side 42 in an extended position. With the wheels 18 in the extended position, the one side 42 is longer as compared to the other side 44. Thus, setting the tilting device 84 to position the wheels 18 on the one side 42 in the extended, places the sawmill 10 in the configuration shown in FIG. 4, namely, the vertical axis 60 of the carriage 14 being angled away from the first axis 74 of the bed (i.e. the tilt angle 80 is greater than 0 degrees), in the second plane 78, such that the blade 48 is angled away from the horizontal, first plane 72 (i.e. the blade angle 82 is greater than 0 degrees). In other words, the carriage 14 is tilted in the second plane 78, from the rail 16 on the one side 42 towards the rail on the other side 44.

Figure 7:
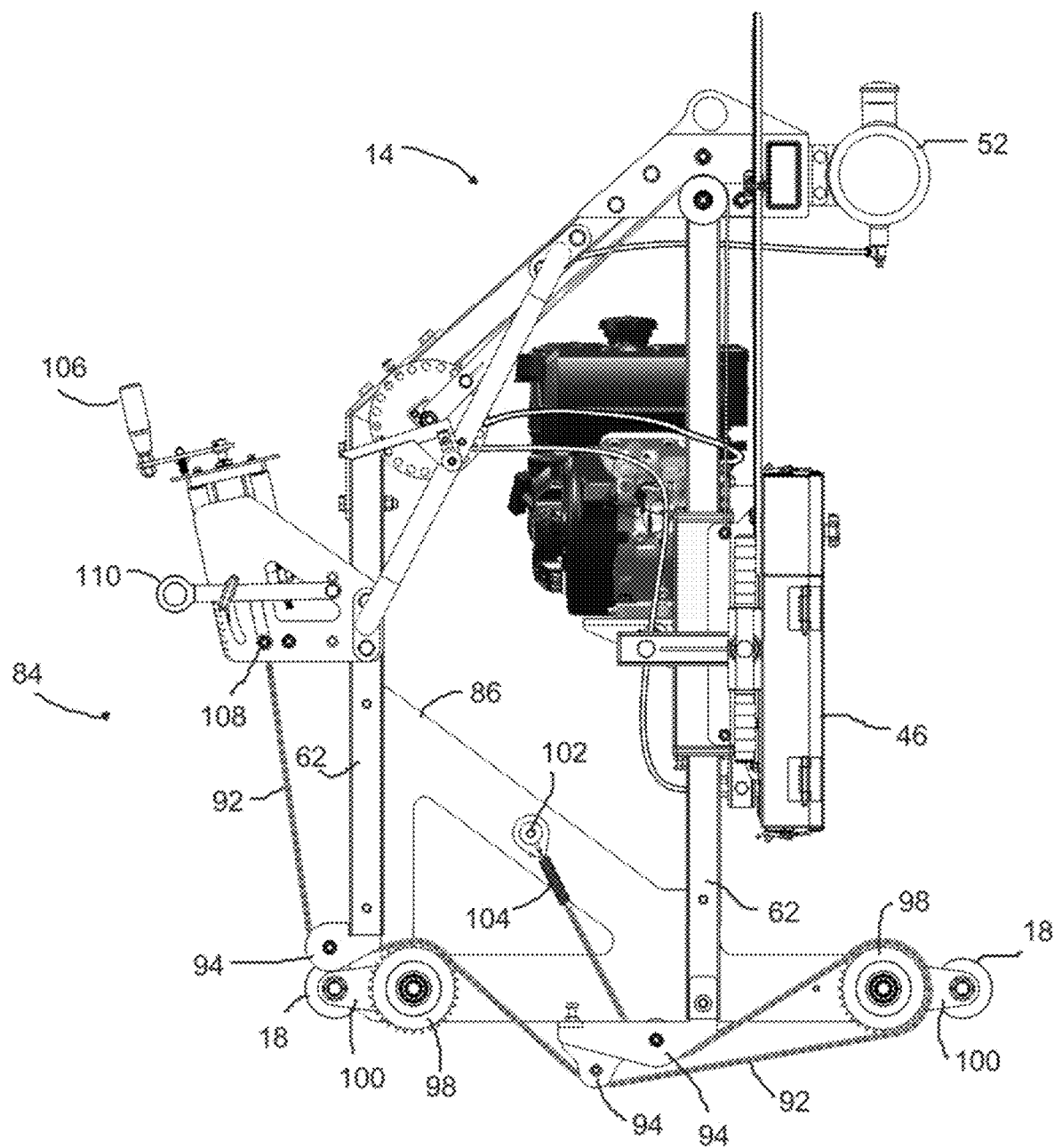
FIG. 7 is a side view of the carriage of FIG. 5, with a frame plate removed for illustrative purposes.
Figure 8:
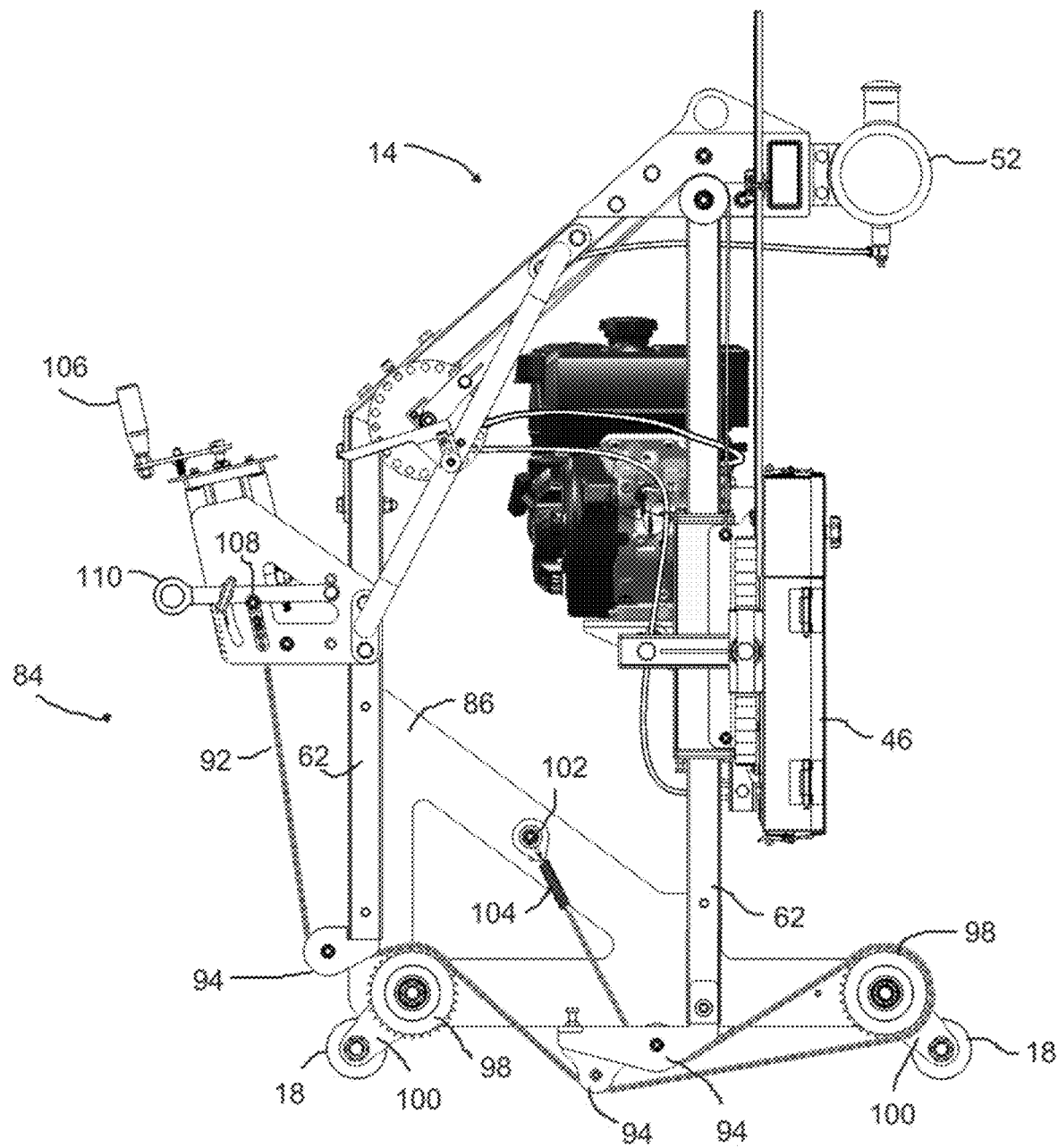
FIG. 8 is a side view of the carriage of FIG. 6, with the frame plate removed for illustrative purposes.

The tilting device 84 discussed above with respect to FIGS. 5 and 6 is more clearly shown in FIGS. 7 and 8. In these figures, the outer frame plate 86 has been removed to show the components of the tilting device 84 contained in the space between the two frame plates 86, on the one side 42. As can be seen, the tilting device 84 is configured to pivotably extend or retract the wheels 18 on the one side 42, to lengthen or shorten the one side 42 of the carriage 14, independently of the other side 44.

Preferably, two sprocket assemblies 90 are pivotally attached between the frame plates 86 on the one side, as shown in FIGS. 7 and 8. Each sprocket assembly 90 has a sprocket 98, that is attached to the frame plate 86 on its axis. One end of an arm 100 is attached to each sprocket 98, and the other end of each arm 100 is attached to a wheel 18. One end of chain 92 is attached to the chain tensioner 96, and wrapped around the sprocket assemblies 98 and guides 94 to terminate at an attachment point 102 on the frame plate 86. Preferably, a spring 104 may be provided between the attachment point 104 and the chain 92.

Accordingly, it will now be appreciated that the preferred tilting device 84 may be manipulated by the operator to control the degree of extension or retraction of the wheels 18 on the one side 42, to thereby adjust the tilt angle 80 of the carriage, and thus the blade angle 82 of the blade 48. For example, the operator may manipulate the chain tensioner 96 to pull the chain 92, which in turn rotates the sprockets 98 of the sprocket assemblies 90, causing the arms 100 to pivotably extend the attached wheels 18. In this case, the spring 104 releases the length of chain 92 taken up by the chain tensioner 96. In reverse, the operator manipulating the chain tensioner 96 to release the chain 92 in turn allows the wheels 18 to pivotably retract under the weight of the carriage 14. In this case, the spring 104 takes up the length of chain 92 released by the chain tensioner 96.

What is important is that the two sprocket assemblies 90 are operatively interconnected by the chain 92 so that the pivotal extension and retraction of the wheels 18 may be synchronized.

Preferably, the chain tensioner 96 may be attached to the frame 40, and provided with a grippable member, such as a handle 106, operatively connected to the chain 92. The greppable member may be gripped by the operator's hands to enable him or her to selectively pull or release the chain 92 to adjust a degree of extension or retraction of the wheels 18 on the one side 42 of the carriage 14. By way of example, the handle 106 may be arranged to drive a mechanical lead screw type actuator with its operative end attached to the chain 92 by a pin 108. Preferably, the chain tensioner 96 may be provided with a tilt angle limit stop 110, which may be set by the operator to limit the maximum tilt angle 80. As can be seen in FIG. 8, the tilt angle limit stop 110 interferes with the upward travel of the pin 108, to limit the maximum length of chain 92 that can be pulled by operation of the chain tensioner 96, thereby limiting the maximum extension of the wheels 18, which in turn limits the maximum tilt angle 80.

Although the tilting devices 84 described above are configured to change the length of one side 42, while the other side 44 remains unchanged, to tilt the carriage 14 towards the other side 44, it is contemplated that the tilting device 84 may be configured to change the length of the other side 44, while the one side 42 remains unchanged, enabling the operator to tilt the carriage 14 towards the one side 42, instead. Furthermore, it is contemplated that the tilting device 84 be configured to enable the operator to selectively change the length of the one side 42 or the other side 44, to cause the carriage 14 to be tiltable towards both the one side 42 and the other side 44. All such embodiments are comprehended by the present invention.

FIGS. 9 to 14 show tilting devices 84 according to other embodiments of the present invention, that enable the operator to selectively change the length of the one side 42, to cause the carriage 14 to tilt from the one side 42 to the other side 44, to adjust the blade angle 82.

Figure 9:
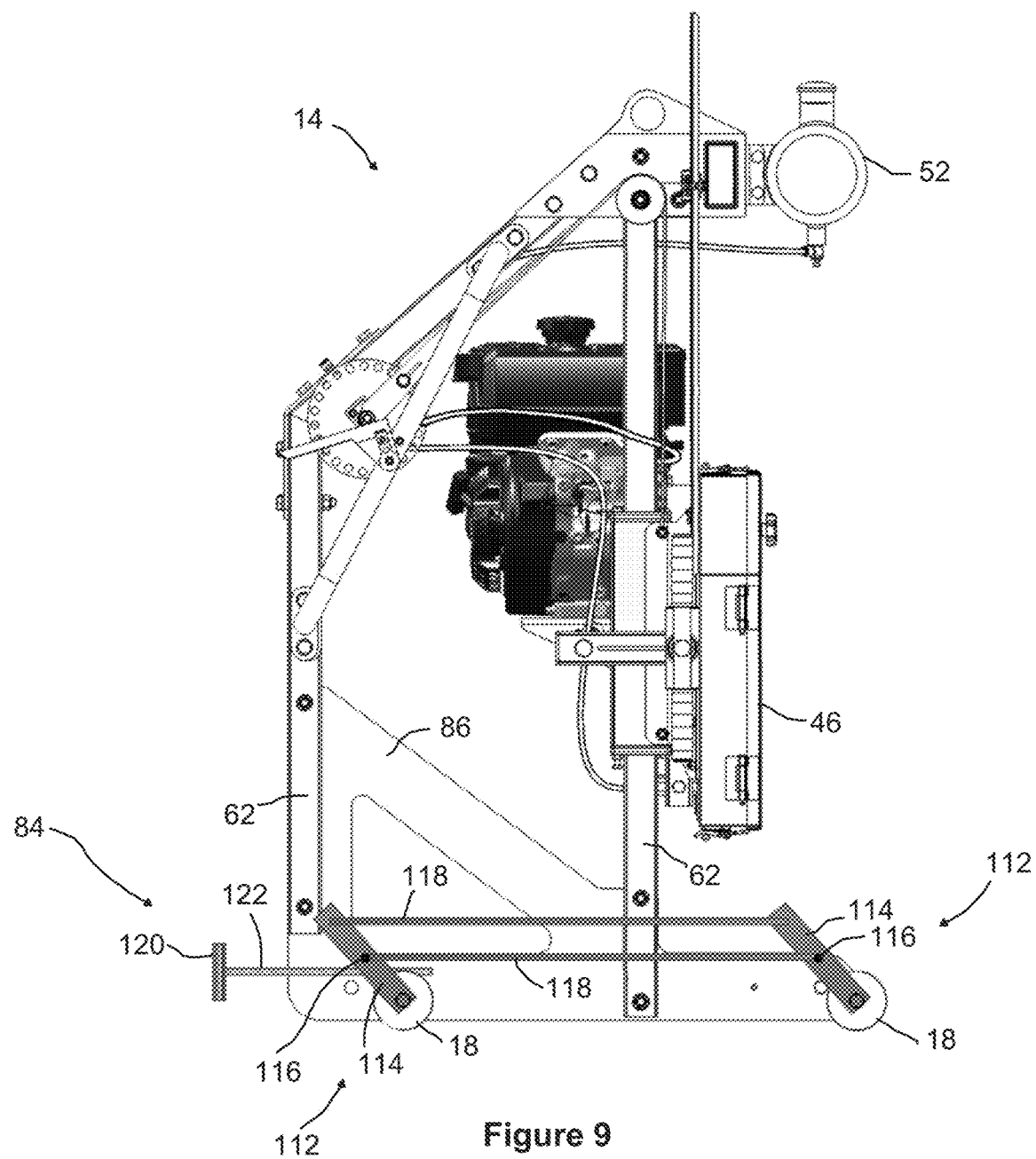
FIG. 9 is a side view of a carriage according to another embodiment of the present invention, with the frame plate removed to show another tilting device comprising a pair of wheel assemblies in a retracted position.
Figure 10:
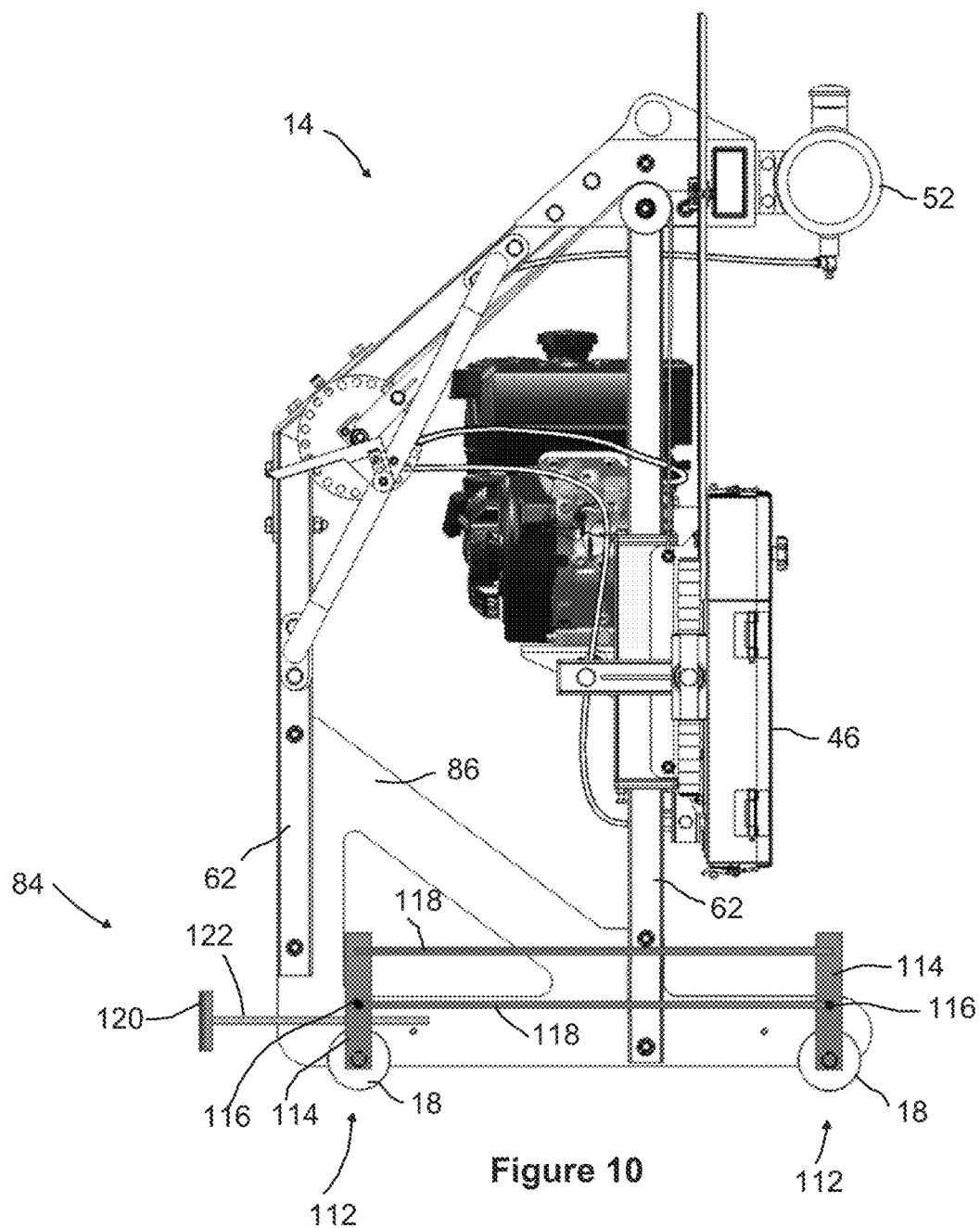
FIG. 10 is a side view of the carriage of FIG. 9, showing the pair of wheel assemblies in an extended position.

For example, FIGS. 9 and 10 show a tilting device 84 employing a parallel motion linkage mechanism. The tilting device 84 is attached to the frame plate 86. The outer frame plate 86 is removed for illustrative purposes, to show the components of the tilting device 84 contained in the space between the two frame plates 86, on the one side 42. As can be seen, the tilting device 84 is configured to pivotably extend (FIG. 10) or retract (FIG. 9) the wheels 18 on the one side 42, to lengthen or shorten the one side 42 of the carriage 14, independently of the other side 44. As shown, the tilting device 84 includes a pair of lever assemblies 112. Each lever assembly 112 includes a lever arm 114 operatively connected to a wheel 18. Each lever arm 114 is pivotably attached to the frame plate 86 on the one side 42 of the carriage 14 by a pivot pin 116. Preferably, the lever arms 114 are interconnected by links 118 such that a pivoting movement of one lever arm 114 translates to the same pivoting movement of the interconnected lever arm 114. The wheels 18 are attached to the ends of the lever arms 114, such that pivoting the lever arms 114 in one direction causes the wheels 18 to extend (FIG. 10), while pivoting the lever arms 114 in the opposite direction causes the wheels 18 to retract (FIG. 9). Preferably, the arrangement of links 118 synchronizes the extension and retraction of the wheels 18. In other words, the two lever assemblies 112 are operatively interconnected by the links 118 so that the pivotal extension and retraction of the wheels 18 may be synchronized.

Preferably, a grippable member 120 may be operatively connected to one lever assembly 112 to enable the operator to pivot the lever arm 114 in one direction or the opposite direction to adjust a degree of extension or retraction of the wheels 18. By way of example, the grippable member 120 may be a handle that is attached to a lead screw 122 operably connected to the one lever assembly 112.

Figure 11:
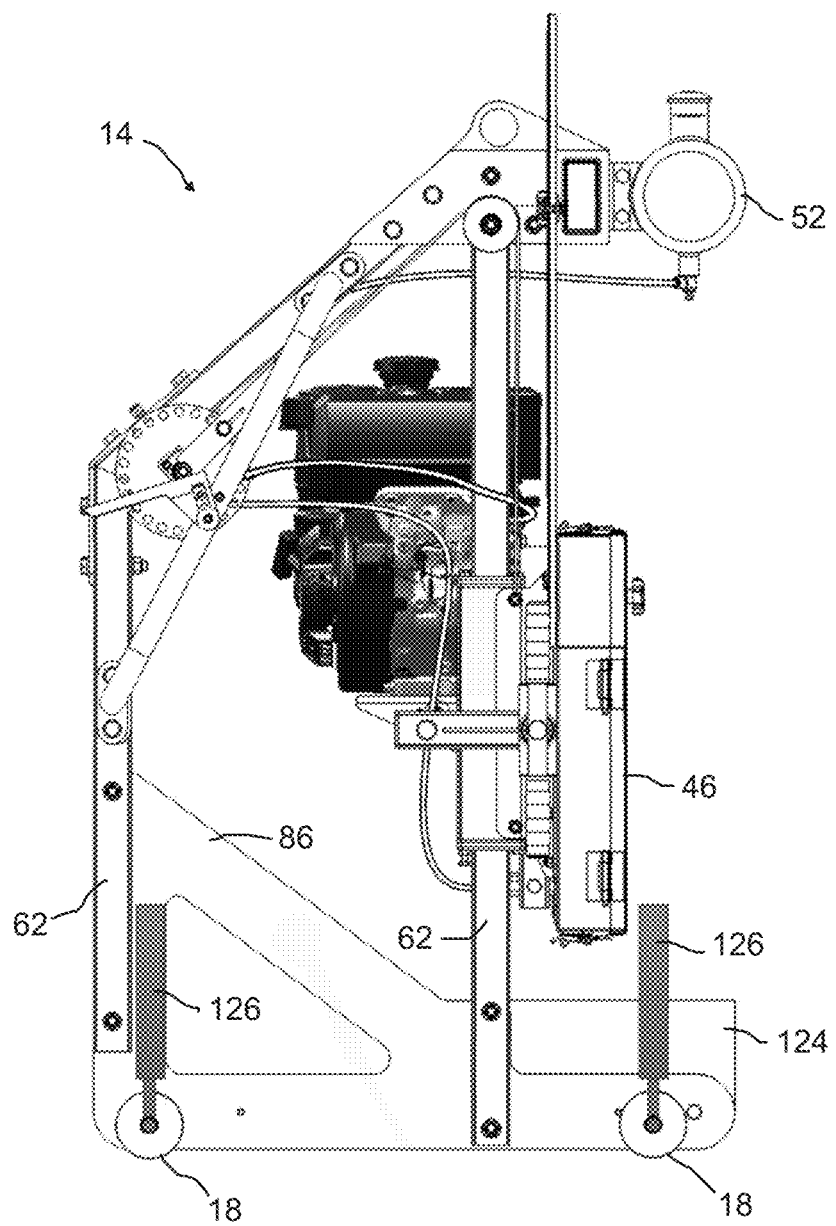
FIG. 11 is a side view of a carriage according to another embodiment of the present invention, with the frame plate removed to show another tilting device comprising a pair of wheel assemblies in a retracted position.
Figure 12:
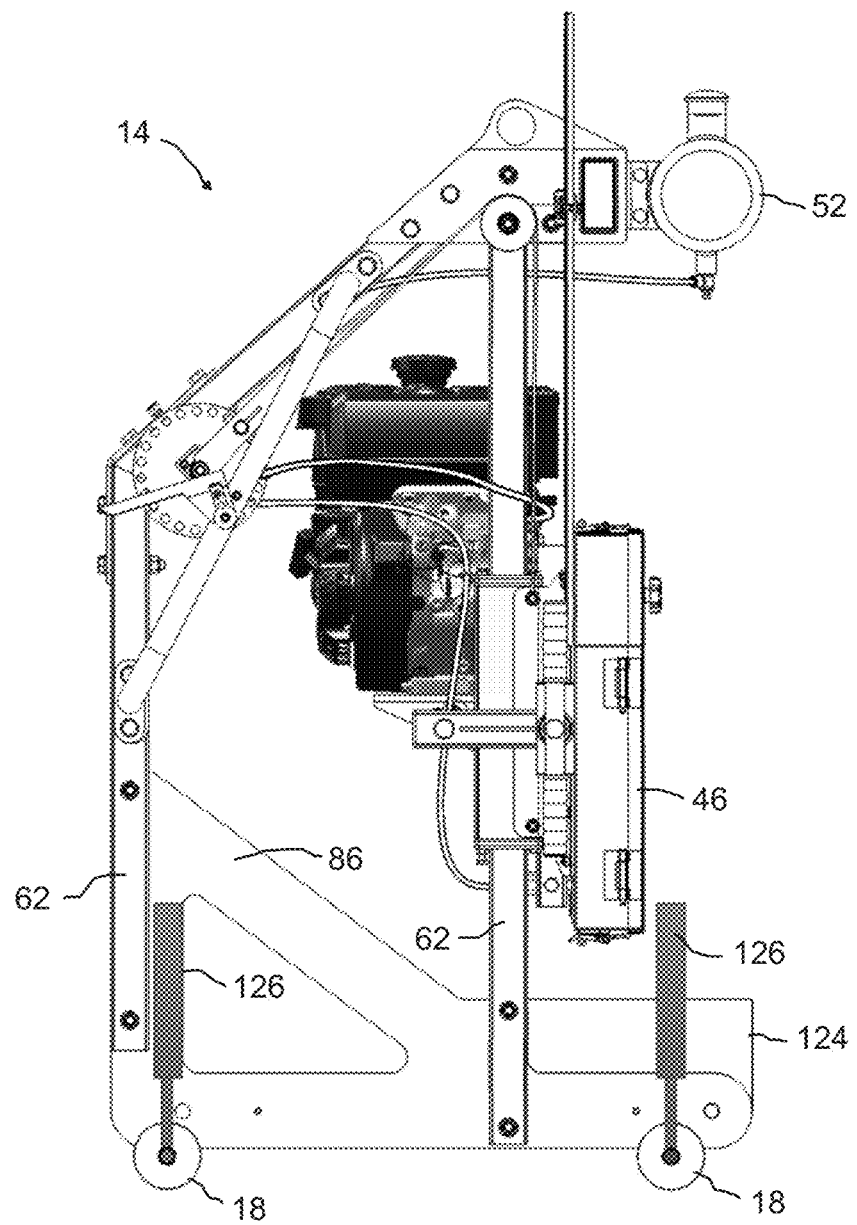
FIG. 12 is a side view of the carriage of FIG. 11, showing the pair of wheel assemblies in an extended position.

As another example, FIGS. 11 and 12 show a tilting device 84 employing a linear actuator mechanism. The tilting device 84 is attached to the frame plate 86, and a supplemental frame plate 124. As in the above examples, the outer frame plate 86 is removed for illustrative purposes, to show the components of the tilting device 84 contained in the space between the two frame plates 86, on the one side 42. As can be seen, the tilting device 84 is configured to linearly extend (FIG. 12) or retract (FIG. 11) the wheels 18 on the one side 42, to lengthen or shorten the one side 42 of the carriage 14, independently of the other side 44. As shown, the tilting device 84 includes two linear actuators 126 each being operatively connected to a wheel 18. One linear actuator 126 is attached to the frame plate 86 on the one side 42 of the carriage 14, while the other linear actuator 126 is attached to the supplemental frame plate 124. The wheels 18 are attached to the linear actuators 126, such that extension of the linear actuators 126 causes the wheels 18 to extend (FIG. 12), while retraction of the linear actuators 126 causes the wheels 18 to retract (FIG. 11). Preferably, the linear actuators 126 are interconnected to synchronize the extension and retraction of the wheels 18. Although not shown, it will be appreciated that the tilting device 84 will preferably include a means to allow the operator to power and control the linear actuators 126.

By way of example only, the actuator may be a mechanical actuator, an electro-mechanical actuator, a hydraulic actuator, a pneumatic actuator, or a solenoid actuator.

Figure 13:
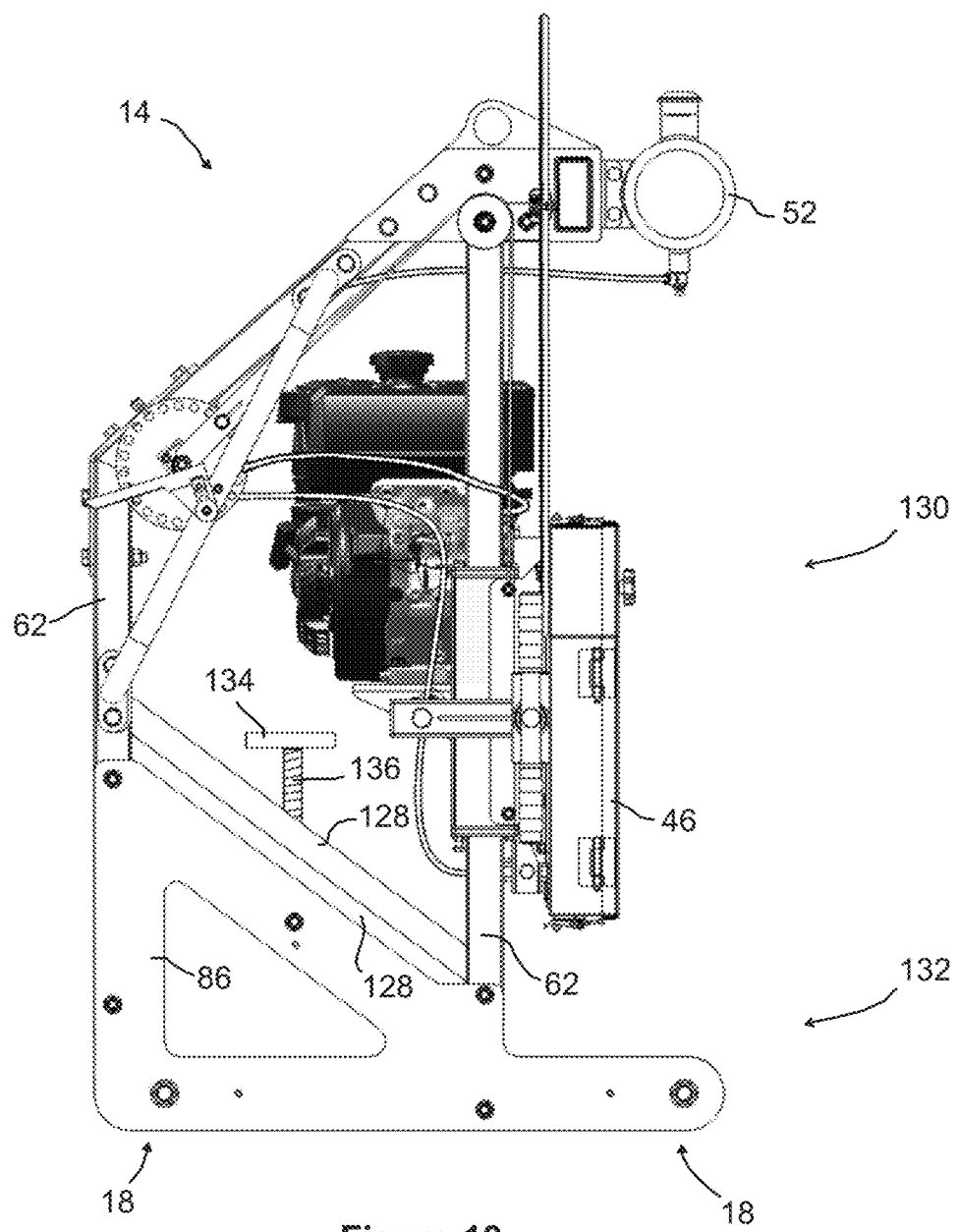
FIG. 13 is a side view of a carriage according to another embodiment of the present invention, showing another tilting device positioning the one side of the carriage in a contracted position.
Figure 14:
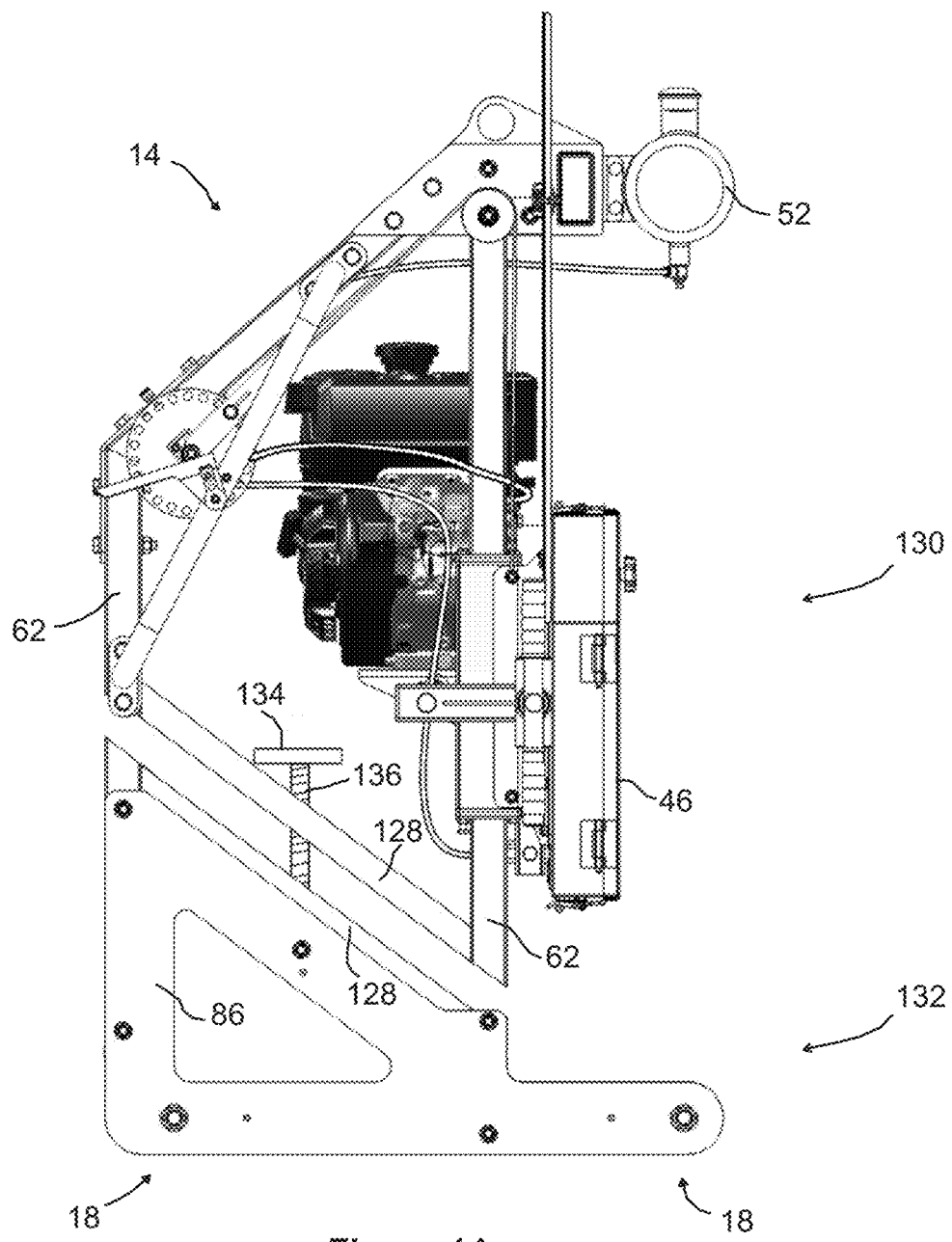
FIG. 14 is a side view of the carriage of FIG. 13, showing the tilting device positioning the one side of the carriage in one side of the carriage in an expanded position.

As yet another example, FIGS. 13 and 14 show a tilting device 84 configured to enable the operator to change the length of the one side 42 of the carriage 14 by expanding (FIG. 14) or contracting (FIG. 13) the one side 42 of the carriage 14. As shown, the tilting device 84 includes a pair of cross members 128 interposed between a top portion 130 and a bottom portion 132 of the one side 42 of the carriage 14.

Preferably, a grippable member 134 may be operatively connected to the pair of cross members 128, to enable the operator to adjust the expansion (FIG. 14) and contraction (FIG. 13) of the length of the one side 42. By way of example, the grippable member 134 may be a handle that is attached to a lead screw 136 operably connected to the pair of cross members 128. In other words, the operator may manipulate the grippable member to force the pair of cross members 128 apart, or together, to selectively adjust the degree of expansion (FIG. 14) and contraction (FIG. 13) of the length of the one side 42.

Having described preferred embodiments of the present invention above, it will now be understood that the operator may adjust the blade angle 82 of the sawmill 10 by the step of manipulating the tilting device 84 to adjust the tilt angle 80 of the carriage 14 in the second plane 78.

Furthermore, it will now be appreciated that the operator may use a sawmill having a carriage 14 movably supported along rails 16 of a bed, to cut a tapered piece from a workpiece material 24 supported on the bed 12 between the rails 16, by tilting the carriage 14 in the second plane 78, at an angle to the first axis 74, and moving the tilted carriage 14 along the rails 16 of the bed 12 in one direction as the blade 48 cuts through the workpiece material 24, thereby cutting the tapered piece from the workpiece material 24. By way of example only, the workpiece material 24 may be made from wood, and the tapered piece is a lap siding board, a roof shingle, a roof shake, or a wood shim.

Preferably, the operator may attach a tilting device 84 to the carriage 14 to facilitate the step of tilting the carriage 14.

Preferably the method for cutting tapered pieces from the workpiece material 24 may also include the step of raising or lowering the saw head 46 or the blade 48 in the carriage 14, along the vertical axis 60 of the carriage 14, to set a desired thickness of the tapered piece.

While reference has been made to various preferred embodiments of the invention, other variations, implementations, modifications, alterations and embodiments are comprehended by the broad scope of the appended claims. Some of these have been discussed in detail in this specificatoin and others will be apparent to those skilled in the art. Those of ordinary skill in the art having access to the teachings herein will recognize these additional variations, implementations, modifications, alterations and embodiments, all of which are within the scope of the present invention, which invention is limited only by the appended claims.

The invention claimed is:

1. A sawmill assembly comprising:
    a bed having a pair of substantially parallel rails, each said rail being attached longitudinally along its length to said bed;
    a carriage having at least one wheel on each of two sides of said carriage, said carriage being movable along said rails on said wheels in at least one direction; and
    a tilting device for tilting said carriage from one of said parallel rails towards the other one of said parallel rails in a plane substantially perpendicular to said at least one direction;
    wherein said carriage is configured to carry a saw head, when operably attached to said carriage, and wherein said tilting device is configured to allow a user to adjust a tilt angle of said carriage by either:
    a) changing a length of one of said sides of said carriage without changing a length of said other side of said carriage; or
    b) changing the lengths of both said sides of said carriage by different amounts.

2. The sawmill assembly according to claim 1, further comprising said saw head operably attached to said carriage, said saw head being configured to cut a workpiece material supported on said bed as said carriage is moved along said rails in at least one direction.

3. The sawmill assembly according to claim 2, wherein said saw head comprises a band saw, a chain saw, a reciprocating saw, or a circular saw.

4. The sawmill assembly according to claim 3, wherein said saw head has a blade defining a cutting edge extending over said bed and arranged to make a cut through said workpiece material on said bed as said carriage is moved along said rails in said at least one direction.

5. The sawmill assembly according to claim 3, further comprising means to raise or lower said saw head, or said blade, relative to said bed.

6. The sawmill assembly according to claim 5, wherein said saw head or saw blade is raised or lowered in a second direction perpendicular to said at least one direction.

7. The sawmill assembly according to claim 1, wherein said tilting device is configured to allow a user to adjust a tilt angle of said carriage in a range suitable for cutting a workpiece material to form a lap siding board, a roof shingle, a roof shake, or a shim; wherein said range is between 0 and ten degrees inclusive, relative to said bed.

8. The sawmill assembly according to claim 1, comprising two wheels attached to each of the two sides of said carriage.

9. The sawmill assembly according to claim 1, wherein said tilting device is configured to change said length of said one side of said carriage by extending or retracting an arm on said one side of said carriage.

10. The sawmill assembly according to claim 9, wherein at least one of said wheels is attached to a free end of said arm for movably supporting said one side of said carriage along said respective rail.

11. The sawmill assembly according to claim 9, wherein said tilting device is configured to linearly extend or retract said arm.

12. The sawmill assembly according to claim 1, wherein said tilting device is configured to change said length of said one side of said carriage by expanding or contracting said one side of said carriage.

13. The sawmill assembly according to claim 12, wherein at least one of said wheels is attached to said one side of said carriage for movably supporting said one side of said carriage along said respective rail.

14. The sawmill assembly of claim 1, wherein the pair of substantially parallel rails and the bed extend along a first plane.

15. A method of cutting a tapered piece from a workpiece material, said method comprising the steps of:
    providing a sawmill comprising:
        a bed having a pair of substantially parallel rails, each said rail being attached longitudinally along its length to said bed;
        a carriage having wheels on two sides of said carriage, said carriage being movable along said rails on said wheels in at least one direction; and
        a saw head attached to said carriage, said saw head comprising a blade defining a cutting edge extending over said bed and arranged to make a cut through said workpiece material on said bed as said carriage is moved along said rails in said at least one direction;
    supporting said workpiece material on said bed;
    tilting said carriage from one of said parallel rails towards the other one of said parallel rails in a plane substantially perpendicular to said at least one direction by either:
    a) changing a length of one of said sides of said carriage without changing a length of said other side of said carriage; or
    b) changing the lengths of both said sides of said carriage by different amounts; and moving said tilted carriage along said rails in said at least one direction as said blade cuts through said workpiece material thereby cutting said tapered piece from said workpiece material.

16. The method of claim 15, wherein said tapered piece is a lap siding board, a roof shingle, a roof shake, or a shim.

17. The method of claim 15, further comprising attaching a tilting device to said carriage to facilitate said step of tilting said carriage.

18. The method of claim 15, further comprising a step of raising or lowering said saw head, or said blade, relative to said bed, to set a desired thickness of said tapered piece.

19. The method of claim 18, wherein said saw head or said saw blade is raised or lowered in a second direction substantially perpendicular to said first direction.

20. The method of claim 15, wherein said carriage is tilted in a plane substantially perpendicular to said at least one direction, prior to said step of moving said tilted carriage along said rails in said at least one direction.

\* \* \* \* \*